United States Patent

[11] 3,609,705

[72] Inventor Brian R. Mercy
Endicott, N.Y.
[21] Appl. No. 880,106
[22] Filed Nov. 26, 1969
[45] Patented Sept. 28, 1971
[73] Assignee International Business Machines Corporation
Armonk, N.Y.

[54] MULTIVIBRATOR RESPONSIVE TO NOISY AND NOISELESS SIGNALS

9 Claims, 9 Drawing Figs.

[52] U.S. Cl. .......... 340/172.5, 307/238, 328/206
[51] Int. Cl. .......... H03k 19/00
[50] Field of Search .......... 340/172.5; 307/238, 247, 289; 328/206, 195, 196

[56] References Cited

UNITED STATES PATENTS

| | | | |
|---|---|---|---|
| 3,296,581 | 1/1967 | Warner | 307/247 |
| 3,388,268 | 6/1968 | Murphree | 307/328 |
| 3,456,208 | 7/1969 | Ratz | 307/289 |
| 3,473,161 | 10/1969 | Goshorn et al. | 340/172.5 |
| 3,508,158 | 4/1970 | Marchese | 307/328 |

*Primary Examiner*—Paul J. Henon
*Assistant Examiner*—Mark Edward Nusbaum
*Attorneys*—Hanifin and Jancin and Norman R. Bardales

ABSTRACT: A multivibrator is provided with a control circuit that generates control signals having a first characteristic which sets and latches simultaneously the output signal of the multivibrator to a binary state that is indicative of the binary state of a noisy input signal at the termination of a first time period. The control circuit also generates the control signals with a second characteristic that sets the output signal of the multivibrator to a binary state which is indicative of the binary state of a noiseless input signal that is applied during a predetermined time interval and thereafter latches the output signal to the binary state to which the output signal was set during the time interval. The first time period is selected to be equal at least to the time duration of the noise time characteristic of the noisy signals thereby allowing the noisy signal to be stored in the multivibrator only after the input signal has reached the binary level which is to be stored. The length of the time interval is selected to allow the setting of the multivibrator at any time within the time interval regardless of the time of arrival, i.e. of application, of the noiseless signal during the time interval. Also, a system in which the multivibrator and control circuit is used for commonly storing signals from a noisy signal source such as a data processing unit and a noisy signal source such as a storage system of the magnetic memory type.

INVENTOR
BRIAN R. MERCY

BY [signature]
ATTORNEY

MULTIVIBRATOR RESPONSIVE TO NOISY AND NOISELESS SIGNALS

BACKGROUND OF THE INVENTION

This invention relates to multivibrator circuits and is particularly useful as a storage device for storing noisy and poorly timed noiseless signals.

Heretofore in certain noise responsive multivibrator circuit types of the prior art, it was known to drive the multivibrator such that the multivibrator would not be set and latched until after some given time period, which commenced with the application of the noisy input signal. This time period was selected to be at least equal to the noise time characteristic associated with the type of noisy signal which was intended to be stored by the multivibrator. Thus, the multivibrator only became set and latched after sufficient time had elapsed for the noisy input signal to be in the actual binary state which was to be stored in the multivibrator.

In other noiseless responsive types of prior art multivibrator circuits, the multivibrator was set and latched immediately upon receipt of a noiseless signal, as long as the input signal was present within a given time interval.

Generally, the multivibrators of one of the two aforedescribed types of prior art multivibrators were not amenable to processing or storing the input signals generally associated with the other type. For example, if the noisy responsive multivibrator were to be utilized with a noiseless signal, noiseless signals arriving during the fixed time period would not be stored in the multivibrator. On the other hand, if a noiseless responsive multivibrator type were to be utilized with a noisy input signal, because of the relatively narrow time interval in which the multivibrator could be set, any noiseless signals which had a longer noise time characteristic could not set the multivibrator, or could be erroneously set to the wrong binary state due to the presence of the noise. Thus, in the past two distinct and separate independent multivibrator types were required to process noisy and noiseless signals thus requiring a concommitant increase in structure, components, complexity, cost, etc.

SUMMARY OF THE INVENTION

It is an object of this invention to provide a multivibrator which is responsive to both noisy and noiseless signals.

It is another object of this invention to provide a multivibrator for storing information from both noisy and noiseless signal sources.

Still another objective of this invention is to provide a system in which the noisy signals from a noisy signal source are transferred to a noiseless signal source and vice versa via a common multivibrator circuit.

According to one aspect of the invention there is provided circuit apparatus which is responsive to mutually exclusively applied predetermined types of noisy and noiseless binary signals. The noisy signal type has a noise time characteristic of a predetermined time duration. The apparatus includes multivibrator means having input means and output means. The multivibrator means provides output signals at the output means in response to the noisy noiseless signals which are applied to the input means. A control means is coupled to the input means and provides thereat control signals having a first predetermined characteristic for setting and latching substantially simultaneously the output signal of the multivibrator means to a binary state that is indicative of the binary state of a noisy input signal at the termination of a predetermined first time period. This time period is equal to at least the time duration of the aforementioned noise time characteristic. In addition, the control signals also have a second predetermined characteristic for setting the output signal of the multivibrator means to a binary state that is indicative of the binary state of a noiseless signal that is applied during a predetermined time interval regardless of the time of application of the noiseless signal, e.g. a poorly timed noiseless signal, during the time interval. Thereafter, the control signals with the second characteristic latch the output signal to the binary state to which the output signal was set during the time interval.

According to another aspect of the invention, a system is provided which includes a source of noisy signals and a source of noiseless signals and a common multivibrator responsive to both, including control means therefor, for storing the signals of both sources.

Still according to another aspect of the invention, a system is provided which includes a data processing unit that generates noisy signals and a storage unit that generates noiseless signals and in which the signals are transferred from one source to another source and/or vice versa by a common multivibrator circuit which includes a control means for this purpose.

The foregoing and other objects, features and advantages of the invention will be apparent from the following more particular description of the preferred embodiments of the invention, as illustrated in the accompanying drawing.

BRIEF DESCRIPTION OF THE DRAWING

FIG. 1 is a schematic view illustrated in block form of the preferred circuit apparatus and systems embodiments of the present invention;

In the Figures, like elements are designated with similar reference numerals.

DESCRIPTION OF THE PREFERRED EMBODIMENT

Figure 4:
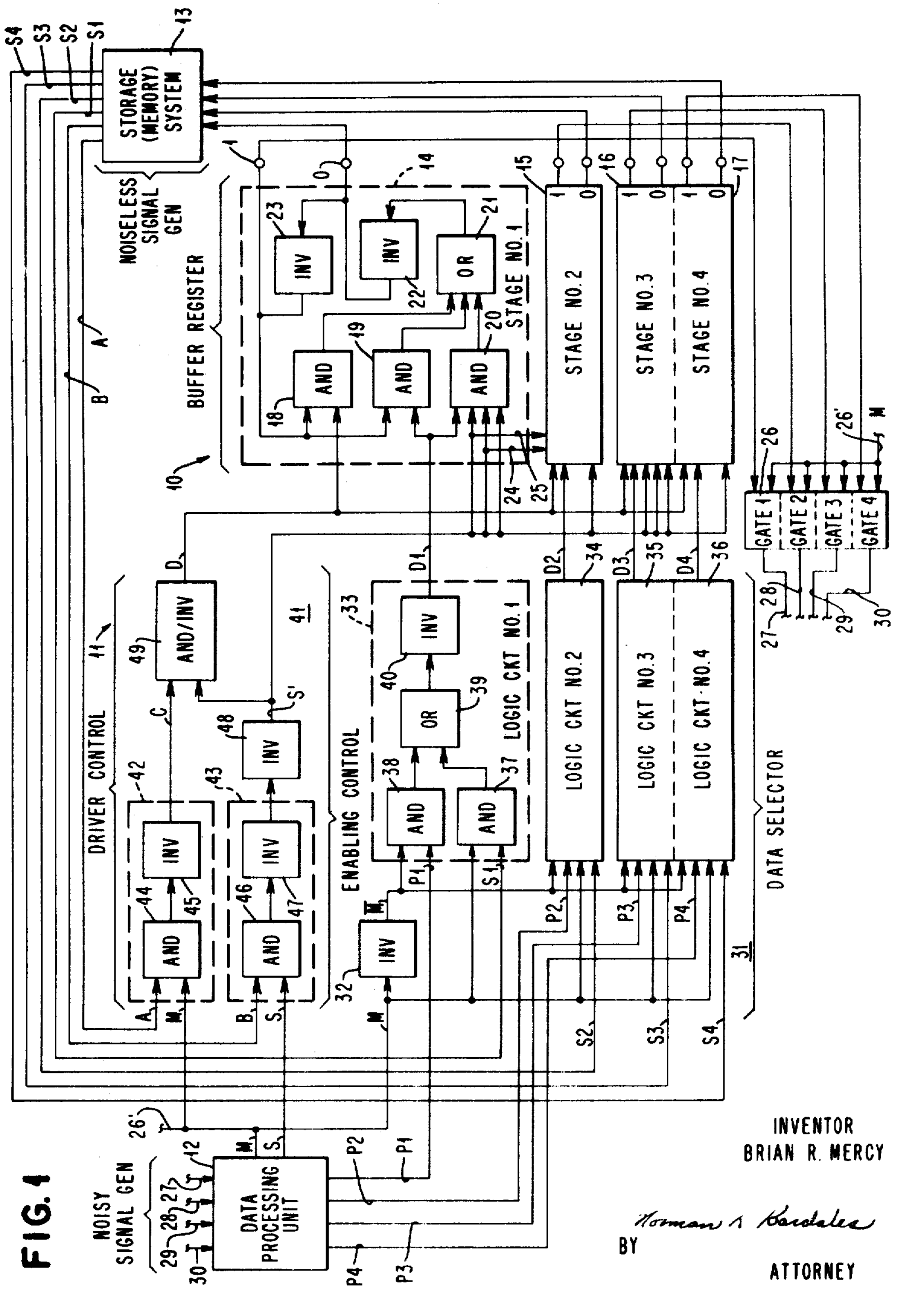
FIG. 4 is a detailed schematic view of a known circuit which may be utilized for a stage of the multivibrator of FIG. 1.

Referring now to FIG. 1, there are shown a preferred circuit apparatus embodiment 10–11 and a preferred system embodiment 10–13 of the present invention. Briefly, the circuit apparatus embodiment includes a multivibrator which is generally indicated by the reference numeral 10. As contemplated by the present invention, multivibrator 10 may have one or more stages. By way of example, the multivibrator 10 is shown in FIG. 1 as having four stages 14 to 17 which are designated in the drawing by the legends STAGE NO. 1, STAGE NO. 2, etc., respectively. Data signals D1, D2, etc., are stored in stages 14 to 17, respectively Data signals D1, D2, etc., are both of the noisy and noiseless types. The driver control circuitry 11 provides control signals D and S' to multivibrator stages 14–17.

Briefly, with respect to the preferred system embodiment, the multivibrator 10 in coaction with the control circuitry 11 selectively stores data signals from a noisy signal source or generator 12 and a noiseless signal source or generator 13 indicated in the drawing by the legends NOISY SIGNAL GEN. and NOISELESS SIGNAL GEN., respectively. More particularly, in the preferred system embodiment, the noisy signal source 12 is a data processing unit which provides noisy binary data signals P1, P2, P3, P4 and control signals M and S hereinafter described. Also, preferably the noiseless signal source 13 is a data storage system such as, for example, a magnetic storage element memory type or the like. System 13 provides noiseless binary data signals S1, S2, etc., as well as certain control signals A and B hereinafter described. Thus, the preferred system embodiment is part of digital computer or data processing system, and the multivibrator 10 acts as a common buffer register for temporarily storing the data being read out of unit 12 and which is to be thereafter stored in the storage system 13 and vice versa, i.e. for temporarily storing the data being read out of the storage system 13 and which is to be thereafter processed by the data processing unit 12.

In accordance with the principles of the present invention, the control signals D and S' are provided by the control circuitry 11 with a first predetermined characteristic when the multivibrator 10 is responding to a noisy input signals, e.g. signal D1. The first predetermined characteristic of the control signals D and S' cause the output signal of the multivibrator 10 to be set and latched simultaneously to a binary state which is indicative of the binary state of the particular noisy signal at the termination of a time period which is equal at least to the time duration of the noise time characteristic of the noisy signals which are to be stored in the multivibrator 10. When the multivibrator 10 is responding to noiseless input signals D1, etc., the control circuitry 11 generates the control signals D and S' with a second predetermined characteristic that first sets the output signal of the multivibrator to a binary state which is indicative of the binary state of the particular noiseless signal that is being applied during a predetermined time interval and thereafter latches the output signal to the binary state to which the output signal is set during the last-mentioned time interval. Under these latter conditions, the multivibrator is set regardless of the time of arrival, that is time of application, of the noiseless signal during the aforementioned time interval. The circuit of FIG. 1, will now be described in greater detail.

Circuits for implementing the stages 14–17 of multivibrator 10 are well known in the art. A known integrated circuit module found suitable for this purpose is a type referred to by the manufacturer as an SN 2472. Each of these known circuit module types contain identical twin circuits on a common substrate. One of the twin circuits is used per stage of multivibrator 10. Hence, for the four stage example of multivibrator 10 shown in FIG. 1, a total of two of these modules is utilized. For example, the stages 14 and 15 are associated with the two circuits, respectively, of one of the modules and the stages 16 and 17 are associated with the two circuits, respectively, of the other module. For sake of clarity, only the circuit of stage 14 is schematically shown in FIG. 1 in detail. It should be understood that only the signal paths of the circuits are illustrated in FIG. 1 and that the biasing and ground connections have been, as is conventional, omitted therefrom for sake of clarity.

Accordingly, the aforementioned known module circuit corresponding to stage 14 includes three AND gates 18–20. The outputs of gates 18–20 are ORed by the OR circuit 21. The output of OR circuit 21 is connected to the 0 or complement output of stage 14 via inverter 22. The output of inverter 22 is also connected to the input of another inverter 23. The latter has its output connected, in turn, to the 1 or true output of stage 14. The output of inverter 23 is also connected in a feedback manner to one of the inputs of each of the two-input AND gates 18 and 19. Signal D from control circuitry 11 is applied to the other input of the AND gate 18. Applied to the other input of AND gate 19 and to the input, which is commonly connected thereto, of the four-input AND gate 20 is the particular data signal D1 which is to be stored in stage 14. The other three inputs of AND gate 20 are externally commonly connected and the signal S' from control circuitry 11 is applied thereto. For the particular aforementioned SN2472 type circuit module, two of the last-mentioned three inputs of the AND gate 20 are connected by two respective internal connections to the corresponding two inputs of the corresponding four-input AND gate of the other circuit of the particular module. Thus, as shown in FIG. 1, it should be understood that the two conductors 24 and 25 schematically represent the two aforementioned internal connections between the two inputs of AND gate 20 of stage 14 and the corresponding two inputs of the corresponding AND gate, not shown, of stage 15. Similar internal connections, not shown, are provided between the twin circuits corresponding to stages 16 and 17, respectively, of the other module as will become more apparent from the detailed schematic of FIG. 4 hereinafter described.

For reasons explained hereinafter, the 0 outputs of stages 14–17 are connected to the respective inputs of storage system 13. The 1 outputs of the stages 14–17 are connected via the gate circuitry 26 and respective conductors 27–30 to the respective inputs of the data processing unit 12. Each stage of multivibrator 10 is connected to one of the inputs of a mutually exclusive one of the parallel-operated gate stages of circuitry 26. Thus, for the four storage stage example of multivibrator 10, circuitry 26 has four normally open gate stages designated by the legends GATE NOS. 1 to 4, respectively. In the presence of an appropriate signal level of an enabling signal applied commonly to the other inputs of GATES NOS. 1 to 4, the information stored in multivibrator stages 14 to 17 is fed to he data processing unit 12. In the preferred embodiments, the UP level of signal M is utilized as the last-mentioned enabling signal, signal M being applied via conductor 26'. In the preferred system embodiment, the gate circuitry 26 is closed by an UP level of signal M when data from source 13 is to be transferred via multivibrator 10 to the source 12. The gating circuitry 26 preferably has inverter means, not shown, associated with it. The inverter means, not shown, converts the binary levels associated with the 1 and 0 data bits present at the respective 1 outputs of multivibrator 10 to levels which are compatible to the 1 and 0 data bit levels of the data signals S1, S2, etc. A suitable gating circuit for this purpose is hereinafter described with reference to FIG. 3*d*. Alternatively, as is apparent to those skilled in the art, in some cases the inputs of the storage system 13 and data processing unit 12 may be connected exclusively, either directly or indirectly, toe same kind of outputs of the multivibrator 10, e.g. the 1 outputs.

In the preferred embodiments, driver control circuitry 11 is configured as logic means with two parts generally indicated in the drawing by the reference numerals 31 and 41, respectively, and designated therein by the legends DATA SELECTOR and ENABLING CONTROL, respectively. The data selector logic 31 selectively gates the data signals from the two sources 12 and 13 to the inputs of the multivibrator stages 14–17. More specifically, the data selector logic 31 allows the data signals from the particular selected source to be applied to the stages of the multivibrator 10 while inhibiting the application thereto of the data signals from the nonselected source. By way of example, the data selector 31 is provided with an inverter 32, which inverts the signal M to its NOT counterpart $\overline{M}$. The signals M and $\overline{M}$ are thereafter ANDed with the signals of the sources 13 and 12, respectively. More specifically, the data selector 31 includes four identical logic circuit stages 33–3 designated in the drawing by the legends LOGIC CKT NO. 1, LOGIC CKT NO. 2 etc., respectively. Stages 33–36 are associated with the data signal pairs P1 and S1, P2 and S2, P3 and S3, and P4 and S4, respectively. Stages 33–36 provide the resultant data signals D1, D2, D3, and D4, respectively. A commercially available integrated circuit module found suitable for implementing the stages 33–36 is a type referred to by the manufacturer as an SN5451. Each of these last-mentioned module types contains two identical circuits on a common substrate. One of these circuits is used per logic stage. Thus, for the four logic stages 33–36, a total of four of these circuits or two of these modules are utilized. Stages 33 and 34 are associated with the two circuits, respectively, of one of the modules, and stages 35 and 36 are associated with the two circuits, respectively, of the other module. For sake of clarity, only one of these module circuits, i.e. the circuit corresponding to stage 33, is shown in detail in FIG. 1, it being understood that the stages 34–36 are similarly configured. Accordingly, stage 33 includes a pair of AND gates 37 and 38, the outputs of which are ORed by an OR circuit 39. OR circuit 39 is connected via the inverter 40 to the previously mentioned commonly connected inputs of the aforementioned AND gates 19 and 20 of multivibrator stage 14. As is apparent to those skilled in the art, the gates 37 and 38 are thus enabled by the signals M and $\overline{M}$, respectively, in a complementary manner. For the particular SN5451 circuit module type, the AND gates 37 and 38 provide an output signal at their respective outputs whenever their respective inputs are in the UP levels. Hence, when it is desired to transfer the data signal P1 to the multivibrator stage 14, signal M is judiciously selected to be at a DOWN level thereby inhibiting the AND gate 37, whereas signal $\overline{M}$ is consequently in the complementary UP state or level and the gate 38 is consequently enabled. As a result, the binary data signals P1 are passed by the AND gate 38, and the data signals S1 are not passed by the GATE 37. When it is desired to transfer data signals S1 to stage 14, signal M switches to its UP level thereby enabling gate 37 and causing the now DOWN level of signal $\overline{M}$ to inhibit gate 38.

In the following TABLE I, there are indicated the various possible binary states 1 and 0 for the signal D1 in response to the various possible conditions of binary states of the signals M, $\overline{M}$, P1 and S1 which are applied to the logic stage 33.

TABLE I

| P1 | $\overline{M}$ | S1 | M | D1 |
|---|---|---|---|---|
| 1 | 1 | 1 | 0 | 0 |
| 1 | 1 | 0 | 0 | 0 |
| 0 | 1 | 1 | 0 | 1 |
| 0 | 1 | 0 | 0 | 1 |
| 1 | 0 | 1 | 1 | 0 |
| 0 | 0 | 1 | 1 | 0 |
| 1 | 0 | 0 | 1 | 1 |
| 0 | 0 | 0 | 1 | 1 |

For the first four conditions indicated in TABLE I, only the binary data signals P1 from source 12 are exclusively fed to stage 14. For the last four conditions indicated in TABLE I only the binary data signals S1 from source 13 are exclusively fed to stage 14. As is apparent from TABLE I, the binary state of the signals of the nonselected source has no effect on the output signal D1. It should also be noted that the binary output signal D1 is generated by the logic circuit 33 with a binary state opposite, i.e. complementary, to the binary state of the signal, i.e. signal P1 or S1 as the case may be, from which it is derived due to the presence of the inverter 40 of the particular aforementioned SN5451 type circuit module used to implement stage 33. It is for this reason the output signal is taken from the 0 output of stage 14 since this last-mentioned signal will have the complementary binary state of the signal D1 and consequently the same binary state of the particular signal, i.e. signal P1 or S1 as the case may be, from which both the signal D1 and the output signal at the 0 output are derived. Moreover, when the output signal at the 1 output of stage 14 is inverted by the aforementioned inverter means, not shown, of GATE NO. 1, the inverted output signal at the output of GATE NO. 1 is in the same binary state as the binary state of the signal S1 from which both the signal D1 and output signal at the 1 output are derived. As aforementioned, signals present at the 1 output of stage 14 are inhibited by GATE NO. 1 when multivibrator stage 14 is accepting signals D1 derived from the data signals P1 of source 12. The other gates of circuitry 26 coact in a similar manner with their associated stages 15–17 and the other respective inputs of source 12 with which they are associated. Likewise, the other logic stages 34–36 coact in response to their associated data signal pairs and the control signals M, $\overline{M}$ with their associated multivibrator stages 15–17, respectively, similar to the aforedescribed manner in which logic stage 33 coacts with its associated stage 14 in response to its associated signal pair P1 and S1 and the control signals M, $\overline{M}$.

The enabling control logic 41 of driver control circuitry 11 as aforementioned, provides the enabling signals D and S' which are fed to the multivibrator stages 14–17. It includes a pair of logic stages 42 and 43 which process the control signal-pairs A and M, and B and S, respectively. Stage 42 includes a series-connected AND gate 44 and inverter 45. Likewise, stage 43 also includes a series-connected AND gate 46 and an inverter 47. The output of stage 43 is connected to the input of an inverter 48. The outputs of the stage 42 and inverter 48 are connected to the inputs of a third logic stage 49 of logic 41 which also includes a series-connected AND gate and inverter circuit combination, shown in FIG. 1 as a single rectangular block AND/INV. Stage 42 provides an output signal C and inverter 48 provides the aforementioned control signal S'. The signals C and S' are ANDed and inverted by stage 49 to provide the resultant aforementioned control signal D.

The operation of the circuit of FIG. 1 will now be described with reference to the waveforms of FIG. 2. In the preferred embodiments, the four illustrated series-connected logic and associated multivibrator stages, i.e. series-connected stages 33 and 14, series-connected stages 34 and 15, etc., are parallel operated. For sake of simplicity, only series-connected stages 33 and 14 are discussed in detail herein, it being understood that the operation of each of the other series-connected logic and multivibrator stages 34 and 15, 35 and 16, and 36 and 17 is the same. Each multivibrator stage has a noisy signal operational mode and a noiseless signal operational mode referred to hereinafter sometimes as MODE I and MODE II, respectively, and which are dependent on the signal M.

For purposes of explanation, it will be assumed that during the time period TI, c.f. FIG. 2, signal source 12 is generating noisy binary data signals which are to be stored in the multivibrator 10, and in particular generates data signal P1 which is to be stored in stage 14. By way of example, it is also assumed that during period TI the signal P1 represents the four binary data bits "1," "1," "0," and "0" in four consecutive data bit periods T, respectively, c.f. DATA IN, FIG. 2. The signals P1 are of the type in which a pulse having a magnitude or amplitude at or above a certain threshold level 50 corresponds to a binary 1 bit; whereas, the absence of a pulse above the level 50, corresponds to a binary 0 bit. Moreover, the signals P1 are of the type which return or remain, as the case may be, to a level below the threshold level 50 at the end of each bit period T. The noisy signals P1 have a noise time characteristic of a time duration *tn*. For the particular type of signal P1 being described, it is assumed the duration *tn* corresponds to the worst case of rise time associated with this type signal when the latter switches from a binary 0 level to a binary 1 level. During the period TI, there are no output data signals S1–S4 generated by the storage system 13. For example, system 13 includes readout gating means, not shown, which is associated with the data signals S1–S4 and which is inhibited during the period TI by an appropriate control signal such as, for example, the signal M.

For the particular logic circuit types shown in FIG. 1, source 12 generates signal M in the DOWN or 0 level during the period TI. Source 12 also generates a binary pulse signal S during each data bit period T. Signal S for the particular logic circuit types of FIG. 1 is in the UP and DOWN levels during the periods TA and TB, respectively, of each period T, where TA plus TB equals T. By way of example, the period TA is shown in FIG. 2 as being equal to the period TB. Storage system 13 generates a pulse signal A during each period T. For the particular logic circuit of FIG. 1, signal A is generated at a DOWN or 0 level during the first part *td* of each period TA. During the second part *te* of the period TA and during the remainder, i.e. period TB, of the period T, signal A is in an UP level. Stated another way, a pulse of signal A is delayed by a period *td* with respect to the commencement to the signal S and hence, the commencement of the period T. The following Table II indicates the various possible binary states 1 and 0 for the signal C and output signals D and S' in response to the various possible conditions of binary states of the signals A, M, B and S which are applied to the logic stage 41 during each of the periods *td*, *te* and TB of each bit period T which occurs during the period TI.

TABLE II

| Period | M | A | C | B | S | S' | D |
|---|---|---|---|---|---|---|---|
| *td* | 0 | 0 | 1 | 1 | 1 | 1 | 0 |
| *te* | 0 | 1 | 1 | 1 | 1 | 1 | 0 |
| TB | 0 | 1 | 1 | 1 | 0 | 0 | 1 |

Figure 2:
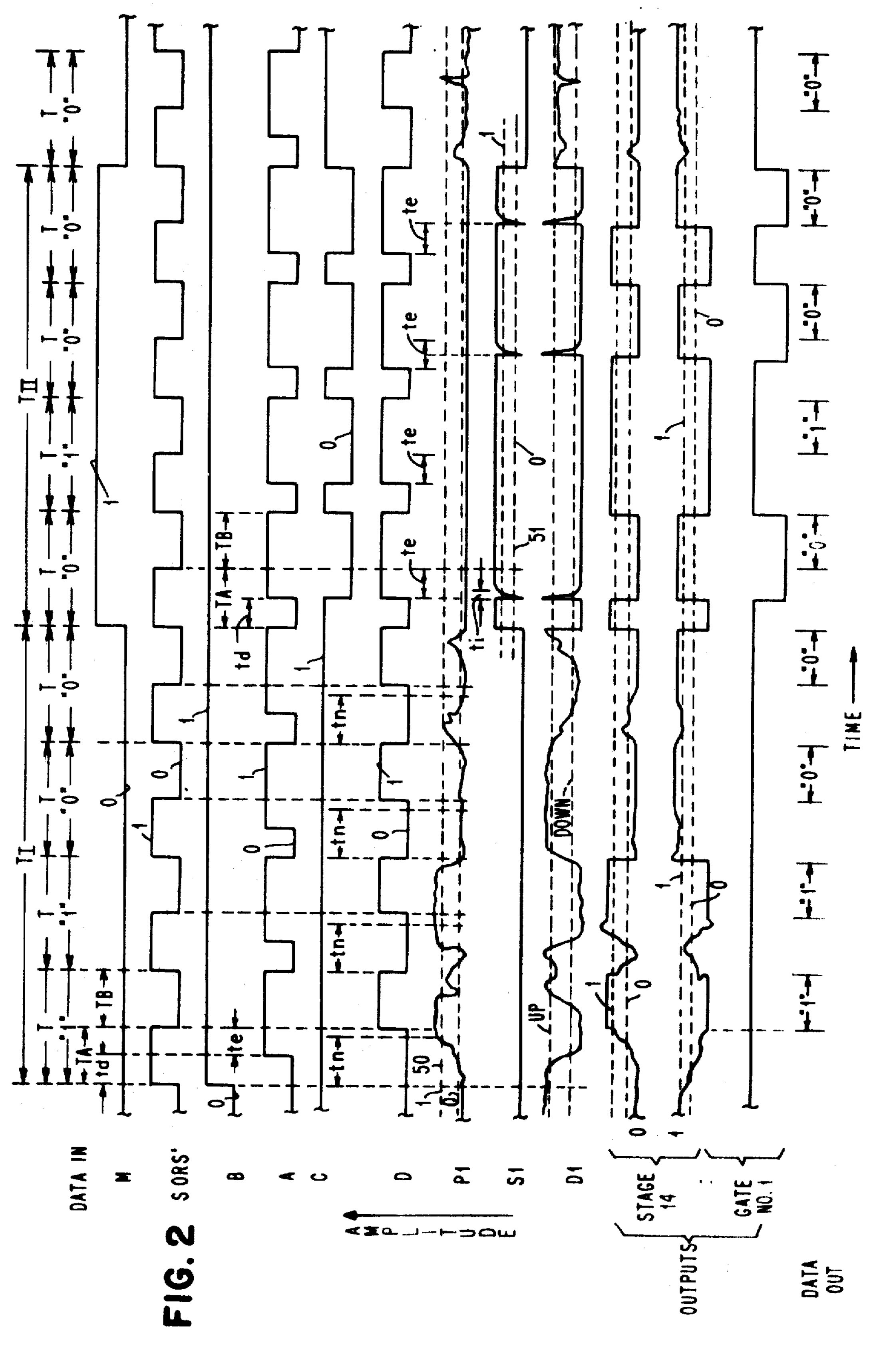
FIG. 2 is a waveform diagram of certain idealized waveforms of the circuit of FIG. 1.

As is apparent from the foregoing Table II and as shown in FIG. 2, the signal S' and D during the period TI for each data bit period T have a complementary first predetermined characteristic. According to the principles of the present invention, the first time period TA is selected to be equal to or greater, as is shown in FIG. 2, than the duration *tn* of the aforementioned noise characteristic of the signals P1. As a result, the noisy signal P1 will have obtained or be in its binary level at the termination or prior to the termination of the time period TA. Furthermore, in accordance with the principles of the present invention, as a result of the control signals D and S', having the aforementioned first predetermined characteristic, during the period TA the output signals appearing at the 1 and 0 outputs of stage 14 are prevented from being set and/or latched. As shown in FIG. 2, the output signals of stage 14 merely follow the waveshape of the input signal D1 in a complementary manner with respect to each other. At the commencement of the time period TB, the control signals D and S' invert or switch to their other respective binary levels, and this same aforementioned first predetermined characteristic causes the output signals of stage 14 to be set and latched simultaneously to a binary state which is indicative of the binary state of the input signal D1 at the end of period TA. More specifically, during this first data bit period T, for example, the output signal present at the 0 output of stage 14 is set and latched simultaneously at the commencement of time period TB to a fixed binary 1 level that is complementary to the binary 0 level of signal D1 at the termination of period TA. On the other hand, during this same first time period T, the output signal present at the 1 output of stage 14 is simultaneously set and latched at the commencement of period TB to a fixed binary 0 level which corresponds to the binary 0 level of signal D1 at the termination of the time period TA. During the subsequent time periods TB, variations in the level of the input signal D1 have no effect on the latched output signals present at the 1 and 0 outputs of stages 14 as shown by the waveforms of FIG. 2 during the period TI.

During the time period TII, it is assumed that the signal source 13 is generating noiseless binary data signals which are to be stored in the multivibrator 10 and in particular generates data signal S1 which is to be stored in stage 14. By way of example, it is assumed that during period TII a signal S1 represents four binary data bits "0," "1, " "0" and "0" in four consecutive data bit periods T. For sake of explanation, it is assumed that the data bit periods associated with the data signals of source 13 are equal to the data bit periods that are associated with data signals of source 12. The signals S1 are of the type in which a relatively narrow spike or pulse, e.g., pulse width *ti*, having an amplitude at or below a certain threshold level 51 corresponds to a binary 0 bit. The absence of a pulse, or a pulse above the level 51, corresponds to a binary 1 bit. Moreover, the signals S1 are of the type which return or remain, as the case may be, to a level above the threshold level 51 at the end of each bit period T. Signals of this type are characteristic of a signal being read out of a particular magnetic storage element, not shown, of the aforementioned magnetic memory system not shown, of the system 13, which may be of the core type, for example.

During the period TII there are no output data signals P1–P4 generated by the unit 12 which, for example, includes output gating means, not shown, which is associated with signals P1–P4 and inhibited by an appropriate control signal such as, for example, the signal M during the period TII. Due to the change in the signal level of signal M during the period TII, the output signals S' and D are provided with a second predetermined characteristic. More specifically, as shown in FIG. 2 and for the particular logic circuit types shown in FIG. 1, during each data bit period T of period TII the signal S' is in the UP or 1 level during the period *td* and *te*, where *td* plus *te* equals TA, and is in the DOWN or 0 level during the subsequent period TB. On the other hand, signal D is in the DOWN level only during the period *td* and in the UP level during the subsequent periods *te* and TB. The foregoing is readily apparent from the following Table III, which indicates the various possible binary states 1 and 0 for the signal C and output signals D and S' in response to the various possible conditions of binary states of the signals A, M, B, and S that are applied to the logic stage 41 during each of the periods *td*, *te* and TB of each particular data bit period T which occurs during the period TII.

TABLE III

| Period | M | A | C | B | S | S' | D |
|---|---|---|---|---|---|---|---|
| *td* | 1 | 0 | 1 | 1 | 1 | 1 | 0 |
| *te* | 1 | 1 | 0 | 1 | 1 | 1 | 1 |
| TB | 1 | 1 | 0 | 1 | 0 | 0 | 1 |

According to the principles of the present invention, when multivibrator 10 is storing noiseless signals, as a result of the control signals S' and D having the aforementioned second predetermined characteristic the particular multivibrator stage is only set during the interval *te*, c.f. waveforms of 0 and 1 outputs of stage 14 during period TII, FIG. 2. It is not until the commencement of the subsequent period TB that the output signals of stage 14 are latched. As before, variations in the waveform of the input signal D1 during the period TB have no effect on the waveshapes of the output signals of stage 14. Moreover, as contemplated by the present invention, the interval *te* is judiciously selected so that the output signals of stage 14 is set regardless of the time of arrival or application of the input signal D1 during the period *te*. Thus, for example, during the first, third and fourth data bit periods T of the period TII shown in FIG. 2, the input pulses thereof are applied by way of example at the commencement, midway, and near the termination of each of the periods *te* associated with the three last-mentioned data bit periods T and the output signals of the stage 14 are set in response thereto. During the period *td* of each of the data bit periods T of period TII, the control signals D and S' prevent the circuit from being set and/or latched and the output signals of stage 14 merely follow the waveform of the input signal D1 in the aforedescribed complementary manner. The following TAble IV indicates the various operational modes of the multivibrator 10 in response to the various binary states 1 to 0 of the signals S' and D present during the different indicated time periods therein.

TABLE IV

| Period | S' | D | Mode |
|---|---|---|---|
| TI: *td* | 1 | 0 | Track |
| TI: *te* | 1 | 0 | Track |
| TI: TB | 0 | 1 | Set/Latch |
| TII: *td* | 1 | 0 | Track |
| TII: *te* | 1 | 1 | Set |
| TII: TB | 0 | 1 | Latch |

It should be noted that during the time period T1, the multivibrator 10 is simultaneously operated in a set and latch operational mode SET/LATCH only after the termination of the period *te*; whereas, during the time period TII the multivibrator 10 is first operated in a set operational mode SET during the period *te* and thereafter is operated in a latch operational mode LATCH at the termination of the period *te*. During the period TI, the multivibrator 10 is in a track operational mode TRACK for the periods *td* and *te*, i.e., the output signals track the input signal as previously explained. However, during the period TII, the multivibrator 10 is in a tracking mode only during the period *td*.

More particularly, with signal S' in the UP level and signal D in the DOWN level, such as occurs during the periods *td* and *te* when a noisy signal D1 is to stored in the stage 14, or such as occurs only during the period *td* when a noisy signal D1 is to be stored, AND gate 20 is enabled and the output of gate 18 is in a DOWN level. Consequently, the output of AND gate 20 will be in an UP or DOWN level depending on whether the level of signal D1 is in an UP or DOWN state, respectively. In the case where signal D1 is in a DOWN level, the output signal of AND gate 20 is at a DOWN level as well as the output signal of AND gate 19. If the signal D1 is in an UP level, however, then the output of AND gate 20 is in an UP level for this case and the output signal of AND gate 19 will be in an UP or DOWN level depending upon whether or not the feedback signal from the 1 output is in an UP or DOWN state, respectively. In either case, the OR gate 21 will provide an output signal in the UP level only when the signal D1 is in an UP level. The inverter 22 inverts the output of OR gate 21 and provides the output signal at the 0 output which is the complement of the input signal D1. Inverter 23, in turn, inverts the output signal of inverter 22 and provides at the 1 output a true output signal of the signal D1. As the level of the input signal D1 varies, so does the level of the output signals generated by the AND gates 19, 20, OR gate 21, and inverters 22 and 23. The output signal of AND gate 18, however, remains at its DOWN level due to the DOWN level of signal D. Thus, the outputs signals S' and D in their UP and DOWN, respectively, relationship cause the output signals of stage 14 to track the input signal D1 and inhibit or prevent the output signals from being positively set and/or latched.

When both signals S' and D are in UP levels, such as is the case only during the period *te* if signal D1 is a noiseless signal, AND gates 18 and 20 are enabled. However, since signal D1 in the noiseless case is in a DOWN level during the previous period *td* the output signal at the 1 output will also be at a DOWN level. Consequently, the level of the output signal of AND gate 18, as well as the levels of the output signals of AND gates 19 and 20, remain in DOWN levels as long as the input signal D1 remains in its DOWN level during the subsequent period *te*. Thus, with the signal D1 in the DOWN level and the two signals S' and D in their UP levels during the period *te*, the output signals of gates 18, 19, and 20 are all in DOWN levels and, consequently, the output signals of the 1 and 0 outputs are set, i.e. remain, in DOWN and UP levels, respectively. However, it the signal D2 goes to an UP level at any time during the period *te*, it causes the level of the output signal of gate 20 to switch to an UP level which, in turn, sets the outputs of stage 14 and causes the levels of the output signals of the 1 and 0 outputs to switch from DOWN to UP and UP to DOWN levels, respectively. With the level of the feedback signal at the 1 output now in the UP state, the levels of the output signals of AND gates 18 and 19 are consequently placed in UP levels. Accordingly, in this last-described case when the input of signal D1 returns from its UP level to its DOWN level, the level of the output signals of the 1 and 0 outputs will remain at their UP and DOWN levels, respectively.

When the signals S' and D are in the DOWN and UP levels, respectively, as is the case during period TB, the output of AND gate 20 goes to a DOWN level. Thus, any variations in the level of the input signal D1 have no effect on the level of the output signals at the 1 and 0 outputs. If just prior to the period TB the signal D1 is in an UP level, then the level of the feedback signal of the 1 output is also in an UP state. Thus, under these circumstances at the commencement of the period TB when the UP level input signals to AND gate 18 are ANDed thereby, the resultant UP level output signal of gate 18 causes the levels of the output signals of the 1 and 0 output to be positively latched to the UP and DOWN states, respectively, and which consequently is indicative of the UP level of the signal D1. If, on the other hand, the signal D2 is in a DOWN level and as a result the level of the output signal of the 1 output is in the DOWN state just prior to the commencement of the period TB, then at the commencement of the period TB, all the levels of the output signal of AND gates 18 to 20 will be in respective DOWN states. As a consequence, the output signals at the 1 and 0 outputs are latched to the DOWN and UP levels, respectively.

From the foregoing description, it is readily apparent that the multivibrator 10 can store two types of signals having diverse characteristics, to wit; noisy signals and poorly timed noiseless signals.

By judiciously actuating the respective read in gating means, not shown, associated with storage system 13 during the time periods TB of each data bit period T of time period TI, the information stored in the multivibrator 10, which was derived from the data processing unit 12, is transferred to the storage system 13, c.f. DATA OUT, FIG. 2. Likewise, it should be understood that during the period TII, the information stored in the multivibrator 10, which was derived from magnetic storage system 13 is transferred to the data processing unit 12 during the time periods TB of each data bit period T associated with the time period TII by judiciously actuating the data input gating means, not shown, associated with the data processing unit 12, c.f. DATA OUT.

Referring now to FIGS. 3*a*–3*f* there are shown known commercially available integrated circuit module types in block form which may be utilized to implement certain stages of the logic control circuitry 11 of FIG. 1. It should be understood that only the signal paths of the circuits of FIGS. 3*a*–3*f* and circuit of FIG. 1 are illustrated and that the biasing and ground connections have been omitted therefrom in a conventional manner for sake of clarity.

Figure 3A:
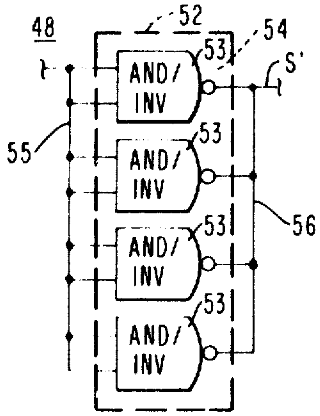
FIGS. 3*a*–3*f* are schematic views illustrated in block form of known circuits which may be utilized for certain of the logic stages and components of the circuit of FIG. 1.

In FIG. 3*a* there is shown, for example, a known integrated circuit module 52 of the type referred to by the manufacturer as an SN5400. It includes four independent AND-inverter circuit combinations 53 on a common substrate 54. For sake of clarity, in FIGS. 3*a*–3*f*, the substrates are schematically represented by dashline rectangles. Each of the circuit combinations of the module have a pair of signal inputs and a single signal output. When these inputs are commonly connected via an external conductor 55 b, the outputs are commonly connected via an external conductor 56, the resultant configuration provides an inverter circuit that is particularly useful for the inverter 48 of logic 41.

Figure 3B:
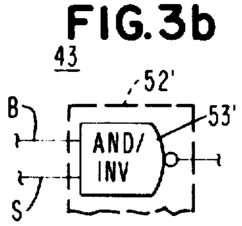

The different logic stages 43 and 49 of logic 41 may also be implemented by different single AND-inverter circuit combinations of this particular SN5400 integrated circuit module type. As shown in FIG. 3*b*, for example, the AND-inverter circuit combination 53' of an SN5400 type module 52', partially shown therein, may be used for the logic stage 43. Likewise, the inverter 32 of logic 31 may be implemented by a single AND-inverter circuit combination 53'' of module 52'', FIG. 3*c*, of the aforementioned SN5400 type by commonly connecting both of the signal inputs thereof with an external conductor 57.

Figure 3E:
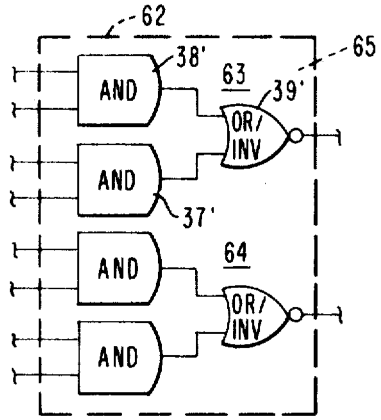
Figure 3D:
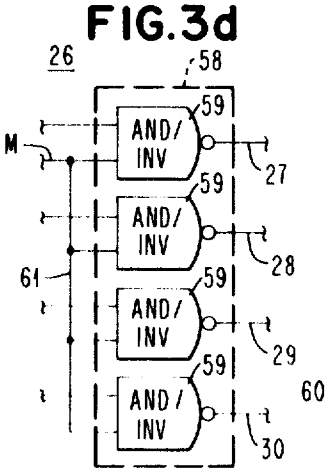
Figure 3C:
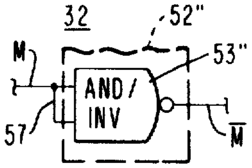

In FIG. 3*d*, there is shown a known integrated circuit module 58 of the type referred to by the manufacturer as an SN5401. The SN5401 type integrated circuit module has four independent AND-inverter circuit combinations 59 on a common substrate 60. Each of the circuit combinations 59 has a pair of signal inputs and a single signal output. Each gate stage of circuitry 26 may be implemented by one of the circuit combinations 59. As such, one input from each of the AND-inverter gate combinations 59 is mutually exclusively connected to a respective one of the aforementioned 1 outputs of the stages 14–17. The other inputs of the combinations 59 are commonly connected by an external conductor 61 and the control signal M is applied thereat.

In FIG. 3*e*, there is shown a circuit module 62 of the aforementioned SN5451 type. As aforementioned, this type has twin identical circuits generally indicated by the reference numerals 63 and 64 on a common substrate 65. As aforementioned, the SN5451 circuit module type may be used to implement the stages 33–36 of logic 31. For example, AND gate 37' and 38' of circuit 63 correspond to AND gates 37 and 38, respectively, of stage 33, and the OR-inverter circuit combination 39' of circuit 63 corresponds to the series-connected OR circuit 39 and inverter 40 of stage 33.

Figure 3F:
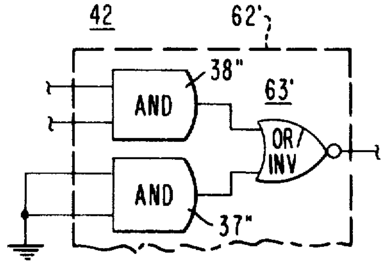
Figure 4:
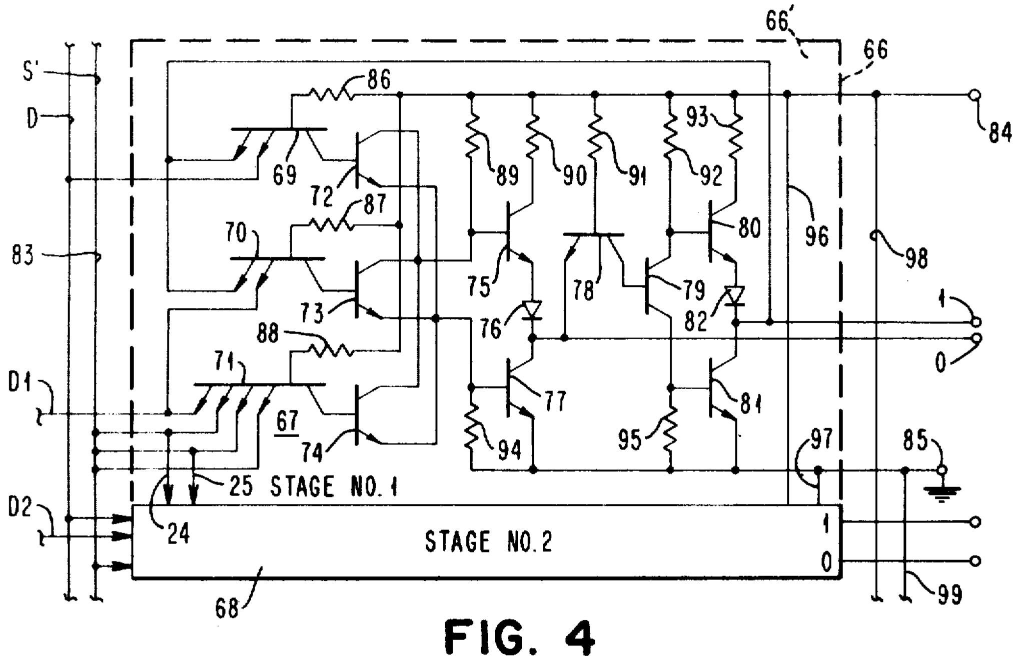

In FIG. 3f, one of the circuits, i.e. circuit 63', of a circuit module 62' of the aforementioned SN5451 type is used to implement stage 42 of logic 41. As shown in FIG. 3f, the two inputs of gate 37", for example, are commonly grounded. The other gate 38" corresponds to the AND gate 44 of stage 42. With this configuration, the circuit 63' functions as a logic AND-inverter as is apparent to those skilled in the art.

A more detailed description of the aforementioned SN5400, SN5401 and SN5451 circuit module type can be obtained from the manufacturer's data sheets which are incorporated by reference herein. More specifically, SN5400 and SN5451 circuit module types are described in a reference entitled "Series 54, Semiconductor Networks," Texas Instruments, Bulletin No. DL-S 669179, Dec. 1966, pages 1001-1005, 1010 and 1011; and the SN5401 circuit type module is described in a reference entitled "Integrated Circuits New-Product Bulletin, type SN5401, SN7401, SN7401N," Texas Instruments, Mar. 1967.

Referring now to FIG. 4 there is shown in greater detail a schematic diagram of the aforementioned SN2472 circuit mode type which may be used for implementing the multivibrator stages 14 and 15, FIG. 1. As aforementioned, the SN2472 circuit module 66 has a pair of twin circuits 67 and 68 on a common substrate 66'. For sake of clarity, circuit 68 is shown in block form in FIG. 2 and corresponds to stage 15, i.e. STAGE NO. 2, of the multivibrator 10 of FIG. 1. Correspondingly, circuit 67 is stage 14, i.e. STAGE NO. 1, of the multivibrator 10.

Circuit 67 includes three common-base amplifier multiemitter transistors 69, 70 and 71 which correspond to the AND gates 18, 19 and 20 respectively, of stage 14. The respective collectors of the transistors 69–71 are connected to the respective base input of the common-base amplifier transistors 72, 73 and 74, respectively. Transistors 72–74 correspond to the OR circuit 21 of stage 14. The collectors of transistors 72–74 are commonly connected to the base input of a common-emitter amplifier transistor 75, which corresponds to the inverter 22 of stage 14. The O output of circuit 67 is connected via the diode 76 to the emitter of transistor 75. The emitters of transistors 72–74 are commonly connected to the base input of the common-emitter amplifier transistor 77.

The emitter of a common-base amplifier transistor 78 is commonly connected to the junction of the diode 76 and collector of transistor 77, and to the O output of STAGE NO. 1. The collector of transistor 78 is connected to the base input of a common-emitter amplifier transistor 79. The collector and emitter of transistor 79 are connected to the respective base inputs of the common-emitter transistors 80 and 81, respectively. Transistors 79–81 coact to function as inverter 23 of stage 14. The 1 output of STAGE NO. 1 is connected via diode 82 to the emitter of transistor 80 and also is fed back to an emitter input of the two-emitter transistor 69. The other emitter input of transistor 69 corresponds to the other input of AND gate 18 of stage 14 and to which the signal D is applied. The feed back signal from the 1 output of STAGE NO. 1 is also applied to one of the two-emitter inputs of transistor 70, which as aforementioned corresponds to AND gate 19. The other emitter input of transistor 70 is connected to one of the four-emitter inputs of transistor 71 and to these so connected two inputs the signal D1 is commonly applied. The other three emitters of transistor 71 are commonly connected by an external conductor 83 to which the signals S' is applied. As aforementioned, two of these last-mentioned three emitters of transistor 71 are internally connected to the corresponding two emitters of the corresponding other four-emitter transistor, no shown, of STAGE NO. 2. The two connections are schematically represented by the conductors 24 and 25. An appropriated bias supply, not shown, is connected to the bias terminal 84 which together with the grounded biasing terminal 85 biases the various transistors of STAGE NO. 1 in coaction with their respective biasing networks, i.e. resistors 86–95. The common biasing terminal 84 and 85 are also connected via the two internal connections schematically represented by the conductors 96 and 97 to the corresponding circuit elements of the STAGE NO. 2. The common biasing terminals 84 and 95 are also connected by the external conductors 98 and 99, respectively, to the corresponding biasing terminals of the other module, not shown in FIG. 2, which includes the two stages 16 and 17 of FIG. 1.

In operation, the circuit 67, i.e., stage 14, is judiciously biased so that application of the control signals D and S' with a predetermined first relationship with respect to their binary signal levels causes the stage 14 to be placed in the aforementioned tracking mode TRACK. Moreover, when the signals S' an D are applied with their binary levels in a second predetermined relationship, the stage 14 is placed in its aforementioned set operational mode SET. In addition, when the signals S and D' are applied with their binary signal levels in a third predetermined relationship, the stage 14 is operated in its aforementioned latch mode LATCH. More particularly, as indicated in FIG. 4 for the particular SN2472 circuit module type, when the signals S and D' are in UP and DOWN levels, respectively, with respect to each other, i.e. the aforementioned first relationship, the stage 14 is in the tracking mode, and, consequently, the stage 14 is inhibited that is, it can neither be set nor latched. When the signals S and D' are both in the UP level, i.e. the aforementioned second relationship, the stage 14 is settable, that is in its set operational mode SET. When the signals S and D' are in their DOWN and UP levels, respectively, with respect to each other, i.e. the aforementioned third relationship, the stage 14 is in its latch operational mode latch.

As is obvious to those skilled in the art, while the invention has been described with particular circuit configuration and types for the multivibrator 10, control circuitry 11, and/or gating circuitry 26, it is to be understood that the invention may be practiced with other configuration and/or types of multivibrators, control circuits, and/or gating means. Moreover, as is also apparent to those skilled in the art, the signals A, M, B, S, may alternatively be generated by other independent means such as another signal generator or a clock or the like which is synchronized with the commencement with each of the time periods T. Moreover, it is obvious to those skilled in the art, the signals S' and D may be provided with other symmetrical and/or asymmetrical waveshapes. It should be further understood that the periodicities T of the input data signals of the sources 12 and 13 need not be equal as shown, but may also be different. Furthermore, while the invention is described using asynchronous data signals and/or control signals, it may also be operated with asynchronous data signals and/or control signals as is apparent to those skilled in the art.

Thus, while the invention has been particularly shown and described with reference to a preferred embodiment thereof, it will be understood by those skilled in the art that various changes in form and details may be made therein without departing from the spirit and scope of the invention.

1. Circuit apparatus responsive to mutually exclusively applied predetermined types of noisy and noiseless binary signals, said noisy signal type having a noise time characteristic of a predetermined time duration, said apparatus comprising in combination:

multivibrator means having input means and output means said multivibrator means providing output signals at said output means in response to the noisy and noiseless signals applied to said input means; and control means coupled to said input means and including means for providing thereat control signals having first and second predetermined characteristics, said first predetermined characteristic of said control signals setting and latching simultaneously said output signal of said multivibrator means to a binary state indicative of the binary state of a noisy signal at the termination of a predetermined first time period equal to at least said predetermined time duration, and said second predetermined characteristic of said control signals setting said output signal of said multivibrator means to a binary state indicative of the binary state of a noiseless signal applied during a predetermined time interval regardless of the time of application of the noiseless signal applied during said predetermined time interval and thereafter latching the output signal to the binary state to which said output signal was set during said time interval.

2. Circuit apparatus to claim 1 wherein said multivibrator means further comprises a predetermined number of bistable circuit stages, and said means for providing said control signals comprises predetermined logic circuit means, said control signals including first and second bilevel control signals, said logic circuit means providing said first and second control signals with their respective levels having at least first, second and third binary relationships with respect to each other, each of said bistable stages being inhibited, exclusively settable, and settable and latchable by said first and second control signals with said, first, second and third relationships, respectively.

3. Circuit apparatus according to claim 2 wherein said logic circuit means provides in the presence of said noisy signal applied to said multi- vibrator means said first and second control signals with said first relationship during said first time period and provides said first and second control signals with said third relationship after said termination of said first time period, said logic circuit means further providing in the presence of noiseless signals applied to said multivibrator means said first and second control signals with said second relationship during said time interval and providing said first and second control signals with said third relationship thereafter said time interval.

4. In a data processing system, the combination comprising:

a first signal source of noisy binary data signals, said noisy data signals having a noise time characteristic of a predetermined duration;

a second signal source of n oiseless binary data signals;

multivibrator means having input means and output means, said multivibrator means providing output signals at said output means in response to the noisy and noiseless signals mutually exclusively applied to said input means, and control means coupled to said input means and including means for providing thereat control signals having a first and second predetermined characteristics, a said first predetermined characteristic of said control signals setting and latching simultaneously said output signal of said multivibrator means to a binary state indicative of the binary state of a noisy signal at the termination of a predetermined first time period equal to at least said predetermined time duration, and said second predetermined characteristic of said control signals setting said output signal of said multivibrator means to a binary state indicative of the binary state of a noiseless signal applied during a predetermined time interval regardless of the time of application of the noiseless signal during said predetermined time interval and thereafter latching the output signal to the binary state to which said output signal was set during said time interval.

5. A data processing system according to claim 4 wherein said multivibrator means further comprises a predetermined number of bistable circuit stages, and said means for providing said control signals comprises predetermined logic circuit means, said control signals including first and second bilevel control signals, said logic circuit means providing said first and second control signals with their respective levels having at least first, second and third binary relationships with respect to each other, each of said bistable stages being inhibited, exclusively settable, and settable and latchable by said first and second control signals with said first, second and third relationships, respectively.

6. A data processing system according to claim 5 wherein said logic circuit means provides in the presence of said noisy signal applied to said multivibrator means said first and second control signals with said first relationship during said first time period and provides said first and second control signals with said third relationship after said termination of said first time period, said logic circuit means further providing in the presence of noiseless signals applied to said multivibrator means said first and second control signals with said second relationship during said time interval and providing said first and second control signals with said third relationship thereafter said time interval.

7. A data processing system according to claim 4 wherein said first and second signal sources comprise a data processing unit and data storage unit, respectively.

8. A data processing system according to claim 7 wherein said data storage unit is of the magnetic memory type.

9. A data processing system according to claim 7 wherein said multivibrator means includes data transfer means for transferring the data from at least one of said sources to the other source through said multivibrator means.